J. C. CLUTTS.
PORTABLE ELECTRIC HEATER.
APPLICATION FILED JULY 20, 1920.
1,358,059.
Patented Nov. 9, 1920.
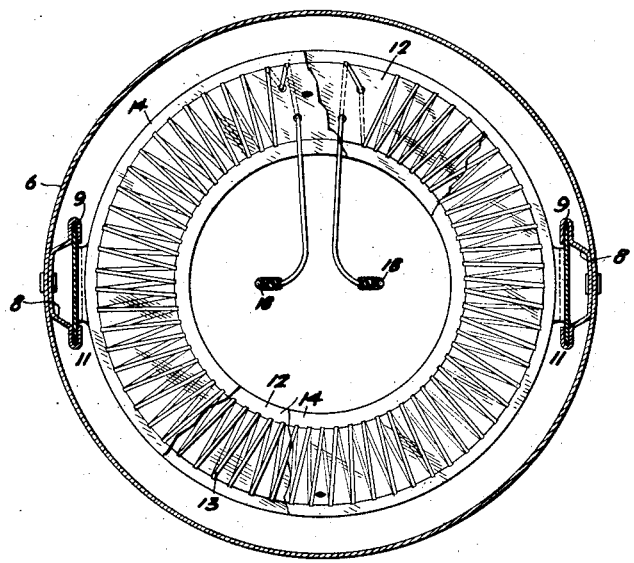
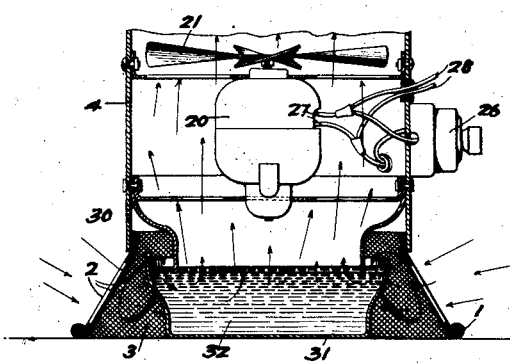

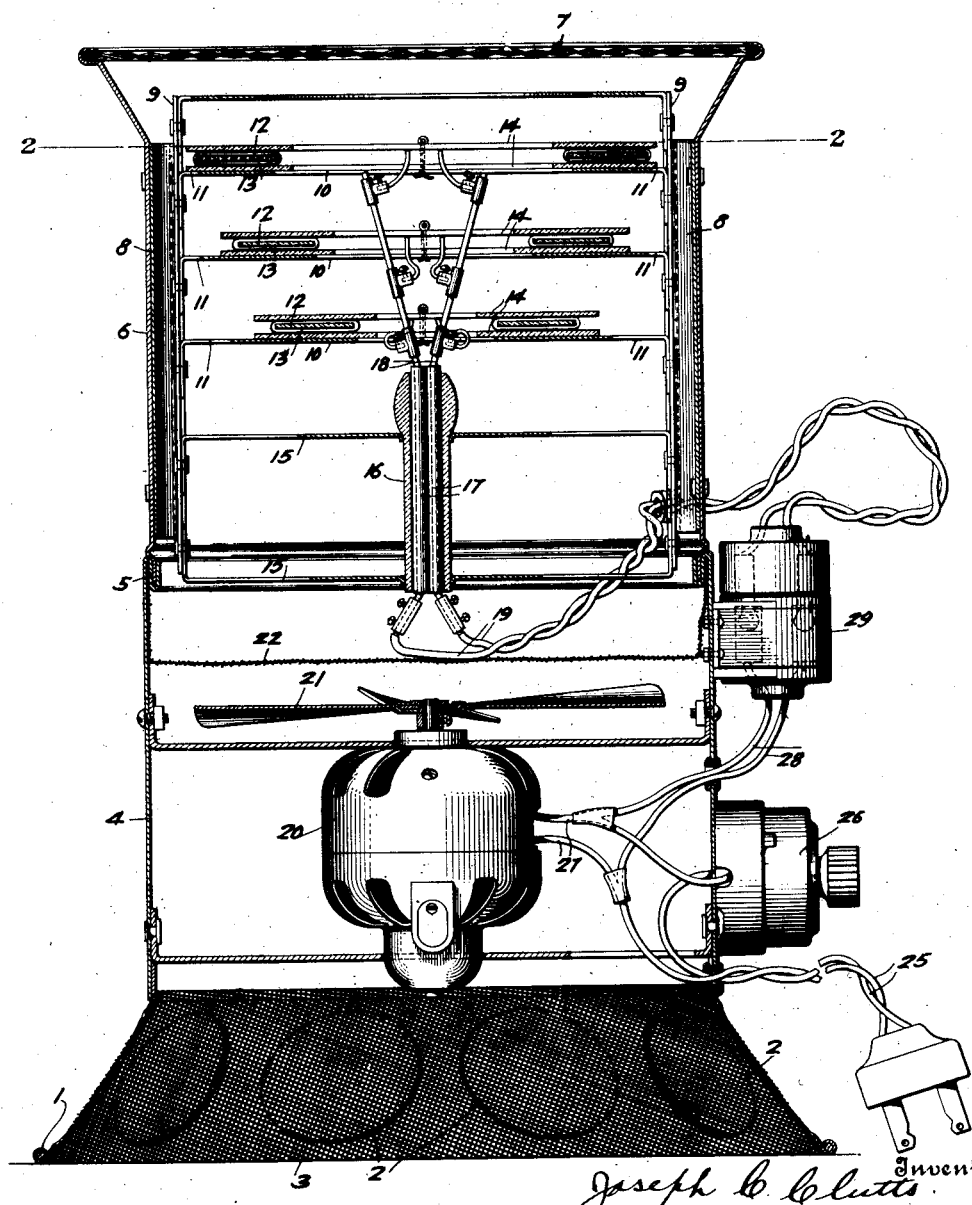

UNITED STATES PATENT OFFICE.

JOSEPH C. CLUTTS, OF FORT THOMAS, KENTUCKY.

PORTABLE ELECTRIC HEATER.

1,358,059.

Specification of Letters Patent.

Patented Nov. 9, 1920.

Application filed July 20, 1920. Serial No. 397,690.

*To all whom it may concern:*

Be it known that I, JOSEPH C. CLUTTS, a citizen of the United States, and residing at Fort Thomas, in the county of Campbell and State of Kentucky, have invented a new and useful Improvement in Portable Electric Heaters, of which the following specification is a full disclosure.

My invention relates particularly to a portable electric heater and air circulating device.

One of the features of the invention relates to the provision of an electric heating device which effects a thorough heating of the air passing therethrough, which does not unduly obstruct the passage of the air, and which permits of the use of a small number of simply formed and easily made heating elements.

Another feature relates to the provision of an electric heating unit which is removable as a unit from the casing of the heater.

Another feature relates to the provision of a heater and air circulator which may be used either as a heater or as an air circulator only, the heater portion of the structure being removable from the air circulating mechanism to permit the circulating mechanism to function freely and without interference and to render the device less cumbersome when used as an air circulator only.

Another object of the invention is to provide a portable domestic electric appliance consisting of an electric heater unit and a motor driven fan or air circulating unit separably united for utilizing the fan unit independent of the heater unit and when combined to provide a forced draft heater with the fan unit as the base for the heater unit.

Another object of the invention is to provide a domestic electric appliance with a sectional casing, having an electric motor driven fan mounted within the base casing section as an air circulating unit and an electric heater element or elements mounted in the top or head casing section as a heater unit, with the electric circuit connections for the heater element established through a separable switch plug connecting with the switch device for the fan, whereby the two electric devices are simultaneously controlled by a single electric switch when the units are combined.

With these and other features hereinafter appearing in view, the invention consists in certain novel combinations, constructions, and arrangements of parts hereinafter fully described with reference to the accompanying drawings, illustrating the preferred form of the invention, and particularly pointed out in the claims.

In the said drawings—

Figure 1 is a central vertical sectional view.

Fig. 2 is a plan section on line 2, 2, Fig. 1.

Fig. 3 is a fragmentary sectional view illustrating a further feature of the invention, this view being drawn on a reduced scale.

Like characters of reference indicate like parts in the various views.

In the drawings 1 designates a base which is frusto-conical in shape and has openings 2 in the wall thereof to afford communication into the inclosure thereof. A screen 3, disposed on the inside of the wall of the base, extends across the openings 2 as guards to prevent the ingress of lint or material capable of being drawn upwardly by suction or air currents which might interfere with or be objectionable to the operation of the device. Supported upon the upper end of the base is a vertically disposed cylindrical casing section 4. This casing is open at both ends, and the upper edge portions thereof are reversely bent at adjacent planes to provide an upwardly facing channel 5 into which engages the lower edge of an upper vertical casing section 6, which is also open at both ends. The upper portion of this casing section is flared, and a screen 7 extends across the top thereof and is secured in the channel edge of the section to provide a guard for the heating elements hereinafter described.

Disposed at diametrically opposite points on the inside of the casing section 6 and secured thereto is a pair of parallel oppositely disposed retaining slides 8, these slides extending vertically from the lower open end of this section. Engaged in these slides for removal therefrom is a pair of slide elements 9, and secured to these slide elements and extending across the space between the same are heating element supports which comprise annular center portions 10 and diametrically opposite arms 11 extending therefrom and secured to respective slide elements. These supports are spaced vertically and mounted on the upper surface of the annular portions of each is a heating element comprising an annular core of mica 12 about which is wound a resistance wire 13 of usual material and annular mica insulating plates 14 disposed on either side of the core of the resistance coil. These heating elements are secured together on respective supports by cotter pins extending through apertures of the respective annular elements and annular portions 10 of the supports. Extending across between the slide elements 9 below the heating element supports are two cross bars 15 which are apertured centrally of the casing, and which support in vertical position by said apertures an insulating bush 16. Secured in the bore of this bush are two insulating tubes 17 through which extend terminal wires 18. These wires extend upwardly in spaced relation through the annular heating elements and the ends of the resistance wires 13 of the heating elements are secured thereto in multiple in a usual manner. The wires 18 extend below the tubes 17 in spaced relation and are secured to insulated wires 19 in a usual manner, these wires 19 extending through an insulated aperture in the casing 6. Thus it will be noted that the heating elements are removably secured in the casing, and that the heating unit as a whole is removable therefrom with obvious advantages.

The shape of the supports 10 of the frame of the heating unit permits these supports to engage and support the entire area of the heating elements without restricting the air passage, and strengthens the heating elements, thus tending to prevent them from sagging or warping, and these supports take up the strains arising in the structure because of expansion or contractions of the structure without imparting them to the heating elements.

The heating elements are spaced between the openings of the casing and extend transversely thereof. They have centrally disposed openings of different sizes and are of different areas, the elements having the larger openings having the greater areas. This permits the width of the heating elements, from the outside circumference to the inner circumference thereof, to be substantially the same in all the elements and permits of a uniform stepping of the heating elements. The heating elements are shaped correspondingly with the cross section of the casing to effect a uniform air flow around the casing and are disposed centrally thereof for the same reason. The heating elements are arranged in stepped order to effect a contact of the different zones of air with the heating elements in regular order, and the smallest element is disposed nearest the intake opening to effect the issuance of a great portion of the air from the last heating element in a unitary stream through the large opening therethrough, and to present the heating element of the greatest area to the air flow, after it has passed the other heating elements, so that the air flow is not restricted so much before it passes the smaller heating elements.

Mounted in a vertical axis within the lower casing section 4, by means of vertically spaced cross supports secured to the lower section, is an electric motor 20 upon the shaft of which a fan 21 is secured. The fan is adapted to impel air up through the casing, the air being drawn in through the openings 2 of the base and passing up through the heating unit and finally issuing through the open upper end of the section 6 through the screen 7.

A screen 22 has upturned edges thereof secured within the downwardly facing channel formed by the bending of the upper edge portion of the lower casing section and extends across this section above the fan 21 to protect the same.

Main circuit wires 25 lead into the lower casing section 4 and include a switch 26 mounted on the section 4 for controlling the main circuit. Beyond the switch inside of the lower section, the main circuit wires branch into multiple circuit wires 27 and 28, the circuit wires 27 leading to the motor, and the circuit 28 passing through an insulated opening in the lower section and connected with the wires 19, leading to the heating unit as hereinbefore described, by means of a pull plug connection 29, having one element secured to the outside of the casing and connected with the circuit wires 28 and having the other element thereof connected with the circuit wires 19.

The upper section 6 is adapted to be removed from the lower section 4, which forms a base structure with the base 2, to permit the use of the fan as an air circulator, the elements of the plug 29 being disengageable for this purpose. It will be noted that when the upper section is removed, the fan may be operated as an air circulator without any further change, the switch 26 being mounted therewith functioning to control the circuit through the fan as well as to control both the fan and heater circuits when the heater is attached.

As hereinbefore described, the air is drawn from through the openings 2 of the base and is impelled upwardly through the casing, thus drawing the cooler lower strata of air and impelling it upwardly. This is of advantage in the use of the device either as a heater or an air circulator for obvious reasons.

In Fig. 3, a modification of the device is shown incorporating in addition to the structure hereinbefore described an air washing and humidifying device now to be described. A downward extending continuation 30 of the lower section 4 is secured at the lower end of this section and terminates in a reduced end within the inclosure of the base. An open water reservoir 31 is disposed within the inclosure of the base 1 and is supported from the floor or other surface upon which the base stands, the lower end of the extension 30 is smaller than the opening of the reservoir and extends downwardly within the reservoir below the top of the same and is submerged in water 32, contained in the reservoir. The suction of the fan draws the air through the openings 2 of the base, over the top of the reservoir and downwardly around the lower end of the extension 31 through the water, and then upwardly through the casing as indicated by the arrows in Fig. 3. It will be noted that the air washing device functions, by reason of its relation with the lower casing section in which the fan is disposed, when the device is used either with the heater section or with it removed therefrom.

Having described my invention, I claim:

1. A device of the nature described including a casing provided with spaced intake and outlet openings, and a series of electrical heating units within the casing and spaced between said openings and extending transversely of the casing, said elements having centrally disposed openings therethrough of different sizes, said elements being of different areas transversely of the casing, the elements having the larger areas having the greater openings.

2. A device of the nature described including a casing provided with spaced intake and outlet openings, and a series of electrical heating units within the casing and spaced between said openings and extending transversely of the casing, said elements having centrally disposed openings therethrough of different sizes, said elements being of different areas transversely of the casing, the elements having the larger areas having the greater openings and being arranged in stepped order.

3. A device of the nature described including a casing provided with spaced intake and outlet openings, and a series of electrical heating units within the casing and spaced between said openings and extending transversely of the casing, said elements having centrally disposed openings therethrough of different sizes, said elements being of different areas transversely of the casing, the elements having the larger areas having the greater openings and arranged in stepped order with the element of least area nearest the intake opening.

4. A device of the nature described including a casing open at its opposite ends, and a series of electrical heating units within the casing and spaced between said openings and extending transversely of the casing, said elements having centrally disposed openings therethrough of different sizes, said elements being of different areas transversely of the casing and disposed centrally of the casing, the elements having the larger openings having the greater area.

5. A device of the nature described including a casing open at its opposite ends, and a series of electrical heating units within the casing and spaced between said openings and extending transversely of the casing, said elements having centrally disposed openings therethrough of different sizes, said elements being of different areas transversely of the casing and disposed centrally of the casing, the elements having the larger openings having the greater area and arranged in stepped order.

6. A device of the nature described including a casing open at its opposite ends, and a series of electrical heating units within the casing and spaced between said openings and extending transversely of the casing, said elements having centrally disposed openings therethrough of different sizes, said elements being of different areas transversely of the casing and disposed centrally of the casing, the elements having the larger openings having the greater area and arranged in stepped order with the element of least area nearest the intake opening.

7. A device of the character described including a casing open at its opposite ends to provide intake and outlet openings, and a series of electrical heating elements within the casing and spaced between said openings and extending transversely of the casing and shaped correspondingly with the cross section of the casing, said elements being of different sizes transversely of the casing and disposed centrally thereof and having different sized openings therethrough at their centers, the larger sized elements having the larger sized openings.

8. A device of the character described including a casing open at its opposite ends to provide intake and outlet openings, and a series of electrical heating elements within the casing and spaced between said openings and extending transversely of the casing and shaped correspondingly with the cross section of the casing, said elements being of different sizes transversely of the casing and disposed centrally thereof and having different sized openings therethrough at their centers, the larger sized elements having the larger sized openings, said heating elements being disposed in stepped arrangement with the smallest heating element nearest the intake opening.

9. A device of the nature described including a casing provided with spaced intake and outlet openings, and an electrical heating unit comprising a frame and a series of heating elements mounted thereon disposed within said casing between said openings and removable as a unit from the casing.

10. A device of the nature described including a casing provided with spaced intake and outlet openings, one of the said openings being provided by an open end of the casing, and an electrical heating unit comprising a frame and a series of heating units mounted thereon disposed within said casing and removable as a unit from the casing through said end opening.

11. A device of the nature described including a casing provided with spaced intake and outlet openings, and a heating element comprising a frame, a series of heating elements mounted thereon, and circuit terminals connected with the heating elements disposed within the casing between said openings and removable as a unit from the casing.

12. A device of the nature described including a casing provided with spaced intake and outlet openings, an electrical heating unit comprising a frame and a series of heating elements mounted thereon and removable from the casing as a unit, and means mounted on said casing and engaging said frame detachably securing said unit in the casing.

13. A device of the nature described including a casing provided with spaced intake and outlet openings, an electrical heating unit disposed within said casing and including a slide element, and a retaining slide element mounted on the wall of the casing within the same and engaged with said slide element to support the heating unit within the casing and adapted to be disengaged therewith to permit the removal of the heating unit.

14. A device of the nature described including a casing open at its ends to provide intake and outlet openings, an electrical heating unit disposed within the casing, including oppositely disposed slide elements, and oppositely disposed supporting slides engaged with said slide elements to support the heating unit within the casing, and adapted to be disengaged therefrom to permit the removal of the heating unit.

15. A device of the nature described including a casing provided with spaced intake and outlet openings, an open end of the casing providing one of such openings, an electrical heating unit disposed within said casing including spaced parallel oppositely disposed slide elements, and similarly oppositely disposed parallel supporting slides extending from said open end of the casing and engaged with said slide elements to support the heating unit within the casing and adapted to be disengaged therefrom to permit the removal of the heating unit through said one end.

16. A device of the character described including a casing provided with spaced intake and outlet openings, an electrical heating unit mounted within said casing between said openings, an electric motor fan mounted within said casing beneath the heating unit to cause the fan to effect an air flow against said heating unit and through said casing.

17. A device of the character described including a casing provided with intake and outlet openings, an electrical heating unit mounted within said casing between said openings, a base structure detachably supporting said casing, and an electric motor fan mounted on said base structure and disposed to effect an air flow through said casing when the casing is mounted on the base structure.

18. A device of the character described including a casing provided with spaced intake and outlet openings, an electrical heating unit mounted within said casing between said openings, a base structure detachably supporting said casing, and an electric motor fan mounted on said base structure and disposed to effect an air flow through said casing when the casing is mounted on the base structure, an electric circuit including said motor fan and heating unit in multiple and including a detachable plug in the heating unit branch of such circuit to permit the removal of the casing.

19. A device of the nature described including a vertical casing open at its upper and lower ends, an electrical heating unit within said casing, a fan disposed within said casing and adapted to draw air into the lower opening and to impel the air up through the casing, through the heating unit and out of the upper openings, and an electric motor driving said fan.

20. A device of the nature described including a vertical casing open at its upper and lower ends and comprising two superposed vertically disposed detachable casing sections, an electrical heating unit mounted within the upper casing section, a fan within the lower casing section and adapted to draw air into the lower opening and to impel air up through the casing and through said heater when the casing sections are positioned to form the casing, and an electric motor mounted with the lower casing and driving said fan.

21. A device of the nature described including a casing open at its ends to provide intake and outlet openings, said casing being comprised of two casing sections detachable one from the other, an electric heater unit mounted within one section between said openings, a fan disposed in the other section and adapted to impel air through said casing and through said heating unit when the two sections are in place to form the casing, an electric motor driving said fan, and means for effecting intimate contact of the air flow through the fan section of the casing with water.

22. In a domestic electric appliance, a sectional casing comprising a base section and a head section separately united and unitarily provided with a vertical conduction, having an air intake at its base, an electric motor driven fan device mounted in said base section, and an electric heater element mounted in said head casing section.

23. In a domestic electric appliance, a sectional casing comprising a base section and a head section separately united and unitarily provided with a vertical conduction, having an air intake at its base, an electric motor driven fan device mounted in said base section, and an electric heater unit mounted in said head section comprising a plurality of superposed different capacity heater elements.

24. In a domestic electric appliance, a sectional casing comprising a base section and a head section separately united and unitarily provided with a vertical conduction, having an air intake at its base, an electric motor driven fan device mounted in said base section, and an electric heater element removably mounted in said head casing section.

In witness whereof, I hereunto subscribe my name, as attested by the two subscribing witnesses.

JOSEPH C. CLUTTS.

Witnesses:
MONROE PHILIP,
JOHN P. PHILLIPS, Jr.